United States Patent
Berenger et al.

(10) Patent No.: US 9,227,725 B2
(45) Date of Patent: Jan. 5, 2016

(54) AIRCRAFT INCLUDING AN ELECTRIC STARTER-GENERATOR FOR THE OR EACH TURBOJET, AN UNDERCARRIAGE FITTED WITH AN ELECTRIC MOTOR FOR TAXIING, AN ELECTRICITY CONVERTER, AND AN ELECTRICITY DISTRIBUTION UNIT CONNECTING THE ELECTRICITY CONVERTER TO THE STARTER-GENERATOR AND THE ELECTRIC MOTOR

(75) Inventors: Serge Berenger, Chevilly Larue (FR); Didier Francois Godart, Villennes sur Seine (FR)

(73) Assignee: LABINAL POWER SYSTEMS, Blagnac (FR)

( * ) Notice: Subject to any disclaimer, the term of this patent is extended or adjusted under 35 U.S.C. 154(b) by 558 days.

(21) Appl. No.: 13/518,254

(22) PCT Filed: Dec. 15, 2010

(86) PCT No.: PCT/FR2010/052734
§ 371 (c)(1),
(2), (4) Date: Nov. 13, 2012

(87) PCT Pub. No.: WO2011/086258
PCT Pub. Date: Jul. 21, 2011

(65) Prior Publication Data
US 2013/0048781 A1   Feb. 28, 2013

(30) Foreign Application Priority Data

Dec. 23, 2009  (FR) .................................. 09 59540

(51) Int. Cl.
*B64D 31/14* (2006.01)
*B64C 25/40* (2006.01)
*B64D 31/00* (2006.01)

(52) U.S. Cl.
CPC .............. *B64C 25/405* (2013.01); *B64D 31/00* (2013.01); *B64D 31/14* (2013.01); *B64D 2221/00* (2013.01); *Y02T 50/823* (2013.01)

(58) Field of Classification Search
CPC ........ B64C 25/02; B64C 25/24; B64D 41/00; B64D 2221/00
See application file for complete search history.

(56) References Cited

U.S. PATENT DOCUMENTS 4,967,096 A * 10/1990 Diemer et al. .................. 307/19
6,018,233 A * 1/2000 Glennon ........................ 322/22

(Continued)

FOREIGN PATENT DOCUMENTS

WO   WO2007027588   *   8/2007
WO     2008 108933       9/2008

OTHER PUBLICATIONS

International Search Report Issued Apr. 13, 2011 in PCT/FR10/52734 Filed Dec. 15, 2010.

*Primary Examiner* — Tien Dinh
*Assistant Examiner* — Michael A Fabula
(74) *Attorney, Agent, or Firm* — Oblon, McClelland, Maier & Neustadt, L.L.P.

(57) ABSTRACT

An aircraft including an electric starter-generator for each of turbojets, and an undercarriage including an electric motor for taxiing the aircraft, which mutualizes an electricity converter for starting and for taxiing the aircraft. A single electricity converter is configured to be coupled to the electric starter-generator associated with a turbojet or to the electric motor of the undercarriage for taxiing, the coupling take place via an electricity distribution unit.

13 Claims, 2 Drawing Sheets

(56) References Cited

U.S. PATENT DOCUMENTS

| | | | |
|---|---|---|---|
| 6,037,752 A * | 3/2000 | Glennon | 322/22 |
| 6,778,414 B2 * | 8/2004 | Chang et al. | 363/67 |
| 7,406,370 B2 * | 7/2008 | Kojori et al. | 701/22 |
| 7,439,634 B2 * | 10/2008 | Michalko | 307/43 |
| 7,445,178 B2 * | 11/2008 | McCoskey et al. | 244/50 |
| 7,482,709 B2 * | 1/2009 | Berenger | 307/45 |
| 7,513,119 B2 * | 4/2009 | Zielinski et al. | 60/778 |
| 7,538,521 B2 * | 5/2009 | Berenger | 322/25 |
| 7,615,892 B2 * | 11/2009 | Anghel et al. | 307/68 |
| 7,936,086 B2 * | 5/2011 | Yue et al. | 307/10.1 |
| 7,975,960 B2 * | 7/2011 | Cox et al. | 244/50 |
| 8,102,077 B2 * | 1/2012 | Neher | 307/9.1 |
| 8,136,756 B2 * | 3/2012 | Duces et al. | 244/58 |
| 8,155,876 B2 * | 4/2012 | White et al. | 701/300 |
| 8,657,227 B1 * | 2/2014 | Bayliss et al. | 244/58 |
| 2004/0129835 A1 * | 7/2004 | Atkey et al. | 244/118.5 |
| 2006/0061213 A1 * | 3/2006 | Michalko | 307/9.1 |
| 2006/0065779 A1 * | 3/2006 | McCoskey et al. | 244/100 R |
| 2006/0174629 A1 * | 8/2006 | Michalko | 60/774 |
| 2007/0257558 A1 * | 11/2007 | Berenger | 307/10.1 |
| 2007/0259545 A1 * | 11/2007 | Berenger | 439/135 |
| 2007/0284480 A1 * | 12/2007 | Atkey et al. | 244/135 R |
| 2008/0211237 A1 * | 9/2008 | Berenger | 290/40 B |
| 2008/0217466 A1 * | 9/2008 | Bhargava | 244/50 |
| 2008/0258014 A1 * | 10/2008 | McCoskey et al. | 244/221 |
| 2009/0015063 A1 * | 1/2009 | Michalko | 307/19 |
| 2009/0114765 A1 * | 5/2009 | Cox et al. | 244/50 |
| 2009/0218440 A1 * | 9/2009 | Dilmaghani et al. | 244/50 |

\* cited by examiner

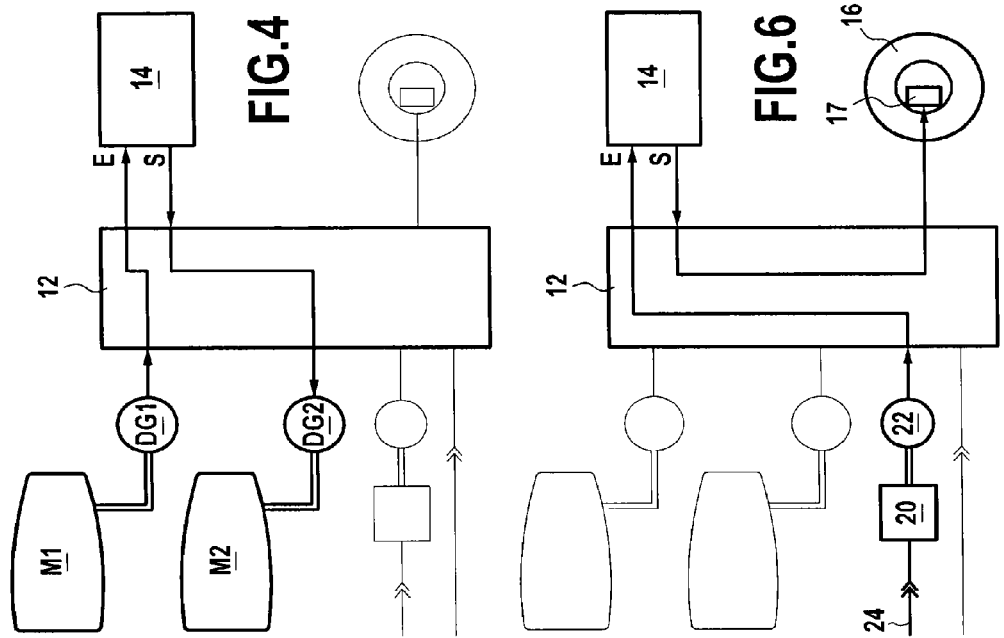
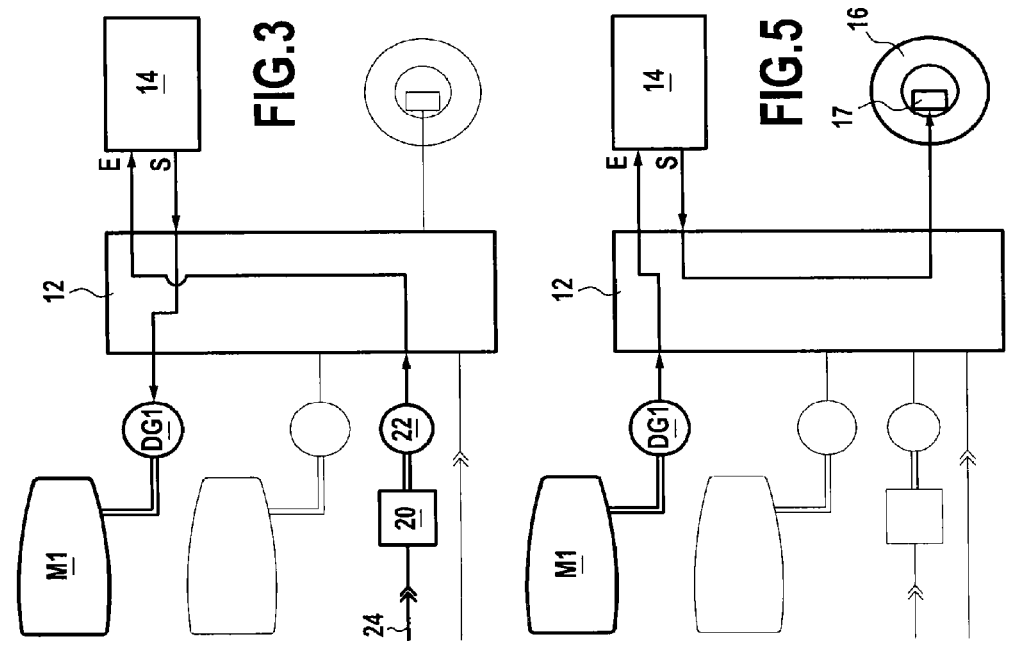

AIRCRAFT INCLUDING AN ELECTRIC STARTER-GENERATOR FOR THE OR EACH TURBOJET, AN UNDERCARRIAGE FITTED WITH AN ELECTRIC MOTOR FOR TAXIING, AN ELECTRICITY CONVERTER, AND AN ELECTRICITY DISTRIBUTION UNIT CONNECTING THE ELECTRICITY CONVERTER TO THE STARTER-GENERATOR AND THE ELECTRIC MOTOR

BACKGROUND OF THE INVENTION

1. Field of the Invention

The invention relates to an aircraft having one or more turbojets, each fitted with an electric starter-generator, and also having an undercarriage fitted with an electric motor for taxiing between an embarkation point and a runway. The invention relates more particularly to an improvement enabling certain subassemblies to be mutualized so as to provide the energy needed for starting the turbojet(s) and also for taxiing the aircraft.

2. Description of the Related Art

In modern airplanes, there is an increasing desire to replace hydraulic or pneumatic auxiliary systems with electrical equipment. Thus, a starter for the or each turbojet is known that comprises an electric starter-generator, i.e. a reversible subassembly that acts as an electric motor on starting if it is fed with electrical energy, or else as an electricity generator if it is driven in rotation by the turbojet after it has started. One such starter-generator subassembly is associated with each turbojet. Furthermore, an undercarriage is known that is fitted with an electric motor for use in taxiing. The electric motor enables the aircraft to be moved on the ground between an embarkation station and a runway. It is often incorporated in the hub of a wheel of the undercarriage.

BRIEF SUMMARY OF THE INVENTION

The invention seeks to rationalize such electromechanical equipment. It results in the observation that the characteristics of electrical equipment needed for starting a turbojet and the characteristics of electrical equipment for driving undercarriages in taxiing are very similar, and that they may therefore be combined.

More particularly, the invention provides an aircraft having a first turbojet fitted with a first electric starter-generator and an undercarriage fitted with an electric motor for taxiing on the ground, the aircraft being characterized in that it includes an electricity converter suitable for being coupled to said starter-generator or to said taxiing electric motor via a configurable electricity distribution unit.

Advantageously, the aircraft has an auxiliary on-board power unit comprising in particular an electricity generator. The generator is connected to said electricity distribution unit in order to power said converter electrically. Said auxiliary power unit may optionally be a fuel cell.

According to another advantageous characteristic, said electricity distribution unit further includes an electrical power inlet for powering said converter from an external source, i.e. from an electricity generator that is available on an airport.

Using these subassemblies, a plurality of configurations can be made available by said electricity distribution unit for connecting said electricity converter (essentially comprising an inverter) to certain selected pieces of equipment in order to be able to choose between various options for starting a turbojet or for taxiing the airplane. These options include in particular:

starting a turbojet using its own starter, with the converter itself being powered by an electricity power source situated outside the airplane;

starting the same turbojet in the same manner but from the auxiliary onboard power unit. It should be recalled that this auxiliary unit may be constituted by a small gas turbine engine (e.g. suitable for being started from an external source of compressed air) that mechanically drives the above-mentioned electricity generator that is itself connected to the inlet of the inverter;

starting the other turbojet using its own electric starter-generator via the converter receiving its energy from a turbojet that is already running, via the electric starter-generator of that turbojet operating as a generator;

causing the airplane to taxi by powering the motor of the undercarriage with the converter receiving its electrical energy from a turbojet that has already been started, the converter receiving its electrical energy from the corresponding starter-generator operating as a generator; and taxiing the airplane by powering the motor of the undercarriage with the converter receiving its energy from the auxiliary onboard power unit.

BRIEF DESCRIPTION OF THE SEVERAL VIEWS OF THE DRAWINGS

The invention can be better understood and other advantages thereof appear more clearly in the light of the following description of an embodiment in accordance with the principle of the invention, given solely by way of example, and made with reference to the accompanying non-limiting drawings, in which:

FIG. 3 is a view analogous to FIG. 1 showing a second possible configuration of the electricity distribution unit;

FIG. 4 is a view analogous to FIG. 1 showing a third possible configuration of the electricity distribution unit;

FIG. 5 is a view analogous to FIG. 1 showing a fourth possible configuration of the electricity distribution unit; and FIG. 6 is a view analogous to FIG. 1 showing a fifth possible configuration of the electricity distribution unit.

DETAILED DESCRIPTION OF THE INVENTION

Figure 1:
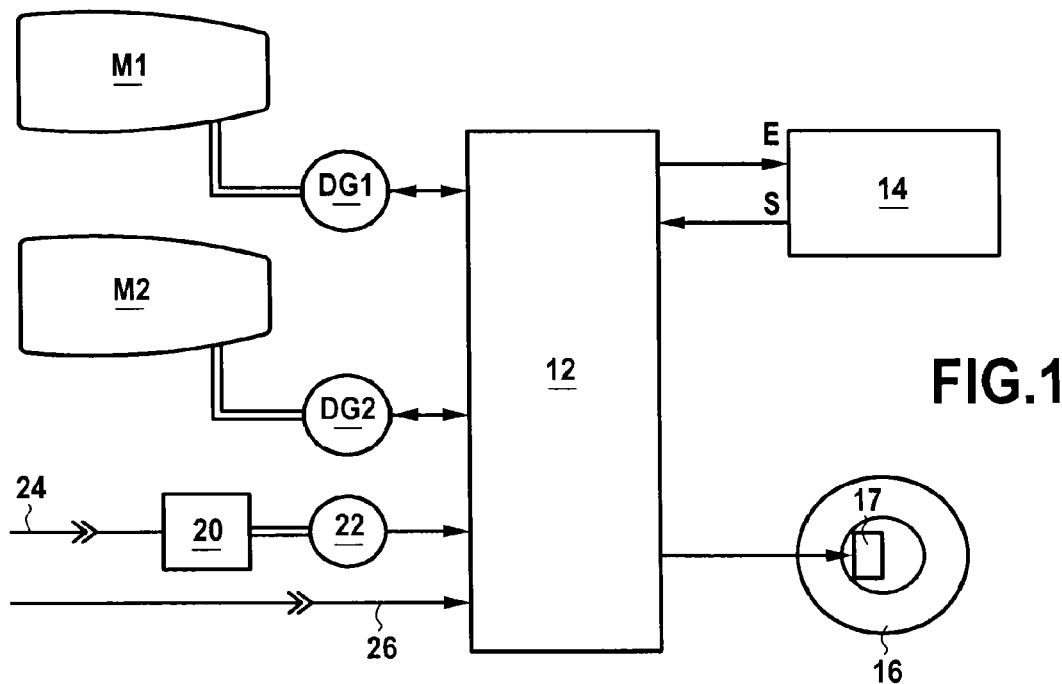
FIG. 1 is a general diagrammatic view showing the architecture that is common to the starter means of the turbojet(s) and to the means for powering the taxiing motor associated with an undercarriage for maneuvering on the ground.

FIG. 1 shows the mutualized electrical equipment serving both for starting the turbojet(s) M1, M2 and for taxiing the airplane on the ground, by means of an electric motor 17 incorporated in an undercarriage 16. In addition to the above-defined subassemblies, the installation has an electricity converter 14, a configurable electricity distribution unit 12, an auxiliary on-board power unit 20 that is associated with an electricity generator 22, likewise on board, and electrical starter-generators DG1 and DG2 respectively associated with the turbojets M1 and M2. The mechanical inlet for starting the turbojet M1 is coupled to the shaft of the electric starter-generator DG1. The mechanical inlet for starting the turbojet M2 is coupled to the shaft of the electric starter-generator DG2. The electrical accesses to the electric starter-generators DG1 and DG2 are connected to the electricity distribution unit 12. The inlet and the outlet of the converter 14 are connected to the electricity distribution unit 12. This electricity distribution unit is connected to the motor 17 in order to power it electrically. The auxiliary on-board power unit 20 in this example is a small fuel-powered engine having an outlet shaft driving the electricity generator 22. The electrical outlet from the generator is connected to the electricity distribution unit 12. The starter of the auxiliary power unit 20 in this example is powered by compressed air delivered by a compressor situated on the ground and connected by a pneumatic connection 24 to the starter. After starting, this unit 20 continues to rotate, being fed with fuel supplied by the airplane.

The electricity distribution unit 12 also has an electrical power inlet 26 for powering the converter 14. This electrical energy is supplied by a generator situated on the ground and connected to the power inlet 26.

The electricity distribution unit 12 comprises a set of controlled switches of the kind that the person skilled in the art knows how to design and that has the function of selectively connecting together the above-described subassemblies in predetermined configurations. It can clearly be seen from the above description that the converter may receive electrical energy via the electricity distribution unit 12 at an inlet E and can simultaneously deliver electrical energy (alternating current (AC) electricity at variable frequency) to the electricity distribution unit via an outlet S. Each electrical starter-generator DG1, DG2 can receive electrical energy via the electricity distribution unit, in which case it constitutes the starter of the associated turbojet. It is a reversible machine that can also constitute a generator of electricity that is distributed via the electricity distribution unit 12 once the shaft of the starter is driven by the corresponding turbojet M1, M2, after it has started.

The electricity generator 22 is driven by the engine of the auxiliary unit 20 and it therefore delivers electrical energy to other subassemblies via the electricity distribution unit 12. Electrical energy applied to the inlet 26 may take its place.

There follows a description of the various possible ways of starting one of the turbojets, specifically the first turbojet M1, using the above-described system.

Figure 2:
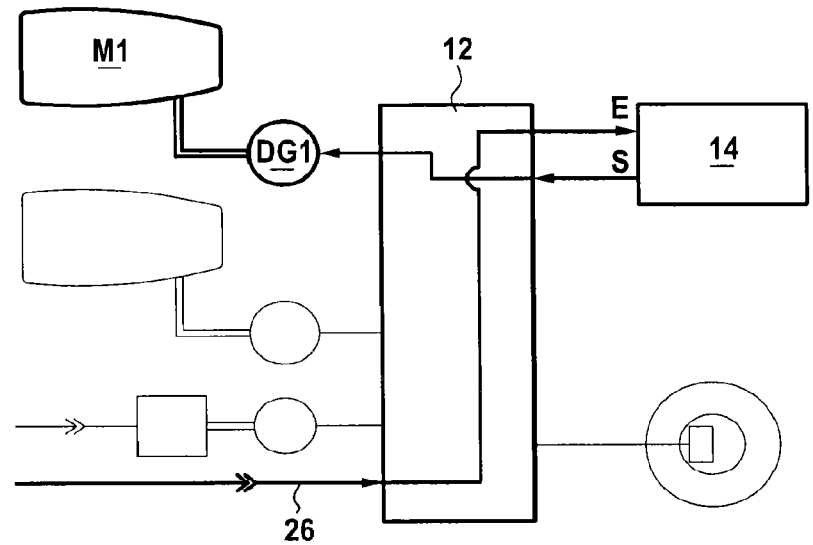
FIG. 2 is a view analogous to FIG. 1 showing a first possible configuration of the electricity distribution unit.

In the configuration of FIG. 2, electrical energy is delivered by the connection 26 connected to an electricity generator on the ground. The distribution unit is configured so that this electrical energy is applied to the inlet E of the converter 14. The outlet S of the converter is connected to the electric starter-generator DG1 that thus acts as a starter. Under such conditions, the starter DG1 drives the shaft of the turbojet M1 until it starts, and then continues to operate while consuming the fuel of the airplane.

Alternatively, as shown in FIG. 3, the auxiliary power unit 20 is put into operation, e.g. using compressed air delivered from the ground via the connection 24, thereby having the effect of driving the generator 22. The distribution unit 12 is configured so that the electrical energy delivered by the generator 22 is applied to the inlet E of the converter 14 and so that the outlet S from that converter is applied to the electrical inlet of the electric starter-generator, so that it can start the turbojet M1.

In FIG. 4, the turbojet M1 has already been started and it therefore drives the shaft of the electric starter-generator DG1 which then acts as an electricity generator and consequently supplies electrical energy to the distribution unit 12. The unit is configured so that this electrical energy is applied to the inlet of the converter 14 and so that the outlet S from the converter is applied to the electrical inlet of the electric starter-generator DG2 operating as a starter, thereby enabling the turbojet M2 to be started.

Naturally, the same system may be extended to a larger number of turbojets, each provided with its own electric starter-generator.

There follows a description of the use of this installation for powering the electric motor 17 for driving movements of the airplane on the ground.

FIG. 5 shows a configuration of the distribution unit 12 in which the electric starter-generator driven by the turbojet M1 delivers electrical energy that is applied to the inlet E of the converter 14. The outlet S of the converter 14 is connected to the motor 17 via the distribution unit 12.

In contrast, in the configuration of FIG. 6, it is the auxiliary on-board power unit 20 that acts via the electricity generator 22 to apply electrical energy to the inlet E of the converter 14, via the distribution unit 12. The distribution unit also connects the outlet S of the converter 14 to the electric motor 17.

The above-described system with its various configurations is particularly advantageous because the functions of starting the turbojet and of providing electrical drive for taxiing on the ground have numerous points in common. Mention may be made in particular of the following:

very high torque at rest due to the inertia and friction of the turbojet or of the wheels of the undercarriage;
utilization that is limited in time (a few minutes);
utilization that takes place essentially on the ground (restarting in flight requires half as much power); and
an electrical frequency of the inverter that is relatively low at the requested power in both of the functions.

Mutualizing these functions of starting and taxiing thus serves to optimize the power converter, in particular concerning its cooling. There is no longer any need to provide cooling for its equipment by circulating a fluid, and on the contrary it is possible to envisage cooling it with air, possibly by natural convection. This mode of cooling by means of air is particularly appropriate when the engines are under the wings and in environmental conditions that are comparable to those of the undercarriage. Electromagnetic filtering is also simpler.

The invention claimed is:

1. An aircraft comprising:
   a first turbojet engine fitted with a first electric starter-generator;
   an undercarriage fitted with a taxiing electric motor for taxiing the aircraft on the ground;
   an external electrical power inlet;
   an electricity converter; and
   an electricity distribution unit;
   wherein an inlet and an outlet of the electricity converter are connected to the electricity distribution unit; and
   wherein the electricity distribution unit is configured to selectively connect the first electric starter-generator, the taxiing electric motor, and the external electrical power inlet to the electricity converter.

2. An aircraft according to claim 1, further comprising an auxiliary on-board power unit including an electricity generator, and wherein the electricity generator is connected to the electricity distribution unit to power the converter electrically.

3. An aircraft according to claim 2, wherein the electricity distribution unit comprises a configuration connecting an outlet of the electricity generator to the inlet of the electricity converter, and the outlet of the electricity converter to the first electric starter-generator operating as a starter.

4. An aircraft according to claim 2, wherein the electricity distribution unit comprises a configuration connecting the electricity generator to the inlet of the electricity converter, and the outlet of the electricity converter to the taxiing electric motor of the undercarriage.

5. An aircraft according to claim 1, wherein the electricity distribution unit comprises a configuration connecting the electrical power inlet to the inlet of the electricity converter and the outlet of the electricity converter to the first starter-generator operating as a starter.

6. An aircraft according to claim 1, wherein the electricity distribution unit comprises a configuration connecting the first starter-generator operating as a generator to the inlet of the electricity converter, and the outlet of the electricity converter to the taxiing electric motor of the undercarriage.

7. An aircraft according to claim 1, comprising at least one second turbojet fitted with a second electric starter-generator, and wherein the electricity distribution unit comprises a configuration connecting the first starter-generator operating as a generator to the inlet of the electricity converter, and the outlet of the electricity converter to the second starter-generator acting as a starter.

8. An aircraft according to claim 1, wherein, in a first configuration of the electricity distribution unit, the inlet of electricity converter is connected to the first starter-generator operating as a generator, and, in a second configuration of the electricity distribution unit, the outlet of the electricity converter is connected to the first start-generator operating as a starter.

9. An aircraft comprising:
- a first turbojet engine fitted with a first electric starter-generator;
- an undercarriage fitted with a taxiing electric motor for taxiing the aircraft on the ground;
- an external electrical power inlet;
- an electricity converter; and
- a configurable electricity distribution unit;

wherein an inlet and an outlet of the electricity converter are connected to the electricity distribution unit; and wherein the electricity distribution unit is configurable to:
- connect the first electric starter-generator to the inlet of the electricity converter and the outlet of the electricity converter to the taxiing electric motor; and
- connect the external electrical power inlet to the inlet of the electricity converter and the outlet of the electricity converter to the first electric starter-generator.

10. An aircraft according to claim 9, further comprising:
an auxiliary, on-board power unit including an electricity generator, and wherein the electricity generator is connected to the electricity distribution unit to power the converter electrically.

11. An aircraft according to claim 10, wherein the electricity distribution unit comprises a configuration connecting an outlet of the electricity generator to the inlet of the electricity converter, and the outlet of the electricity converter to the first electric starter-generator operating as a starter.

12. An aircraft according to claim 10, wherein the electricity distribution unit comprises a configuration connecting the electricity generator to the inlet of the electricity converter, and the outlet of the electricity converter to the taxiing electric motor of the undercarriage.

13. An aircraft according to claim 9, comprising at least one second turbojet fitted with a second electric starter-generator, and wherein the electricity distribution unit comprises a configuration connecting the first starter-generator operating as a generator to the inlet of the electricity converter, and the outlet of the electricity converter to the second starter-generator acting as a starter.

* * * * *